Sept. 27, 1927.

W. A. HUTCHINSON

WHEEL STRUCTURE

Filed May 25, 1927

1,643,379

Inventor

W. A. Hutchinson

By Clarence A. O'Brien
Attorney

Patented Sept. 27, 1927.

1,643,379

UNITED STATES PATENT OFFICE.

WILLIAM ANDREW HUTCHINSON, OF ORLANDO, FLORIDA.

WHEEL STRUCTURE.

Application filed May 25, 1927. Serial No. 194,130.

The present invention relates to improvements in vehicle wheels and has for its principal object to provide a series of tire supporting rims arranged in side by side relation whereby to provide a wheel structure having a series of pneumatic tires mounted thereon.

One of the important objects of the invention is to provide a wheel structure which is more particularly adapted to be used on Fordson tractors and to equip the tractor with pneumatic tires.

A still further object of the invention is provide a wheel structure wherein the several parts may be readily assembled or disassembled, the same being further simple in construction, inexpensive, strong and durable and further well adapted to the purpose for which it is designed.

Other objects and advantages of the invention will become apparent from the following description taken in connection with the accompanying drawing.

In the accompanying drawing forming part of this application and in which like numerals indicate like parts:

Figure 1:
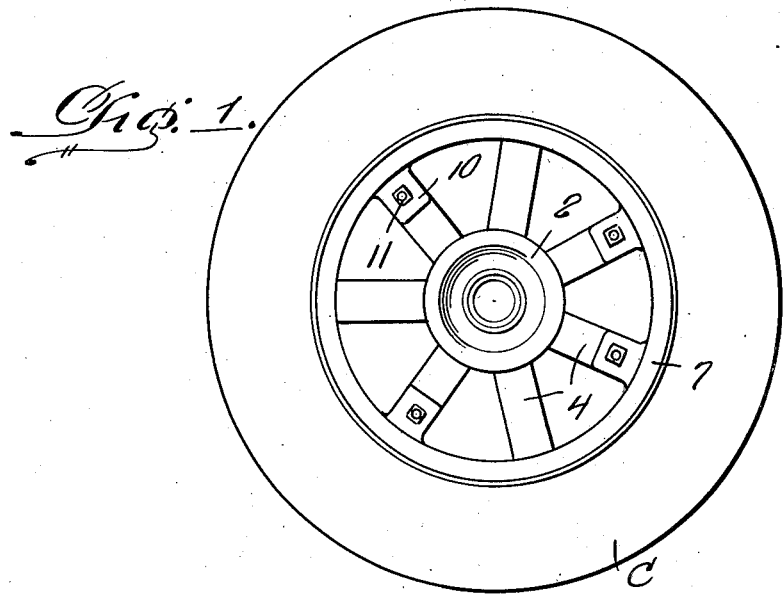
Figure 1 is an elevational view of the wheel structure embodying my invention looking at one side thereof.

In the drawing wherein for the purpose of illustration is shown the preferred embodiment of my invention, the numeral 1 designates an intermediate or main wheel, the same comprising a hub 2 from which extends the radial spokes 3 and 4, respectively. These spokes are preferably in the form of flat elongated strips of metal and the series of spokes designated by the numeral 3 extend from one end portion of the hub, while the other series of spokes designated by the numeral 4 extend from the other end portion of the hub in the manner as clearly shown in Figure 3. The series of spokes gradually converge toward their outer ends and are secured to the respective edge portions of the main or intermediate tire supporting rim 5 on which is adapted to be demountably supported the pneumatic tire A, it being understood of course that the rim 5 is formed at one edge with an annular flange, while the locking ring is detachably associated with the other edge of the rim in the manner well known in the art, and for the purposes also well known.

The present invention also includes the provision of the outer tire supporting rims 6 and 7, respectively, the same being disposed on opposite sides of the main or intermediate wheel 1. These tire supporting rims are of substantially the same size, as clearly illustrated in the drawing. The rim 5 carries thereon the pneumatic tire B, while the pneumatic tire C is mounted on the other outer rim 7.

Figure 2:
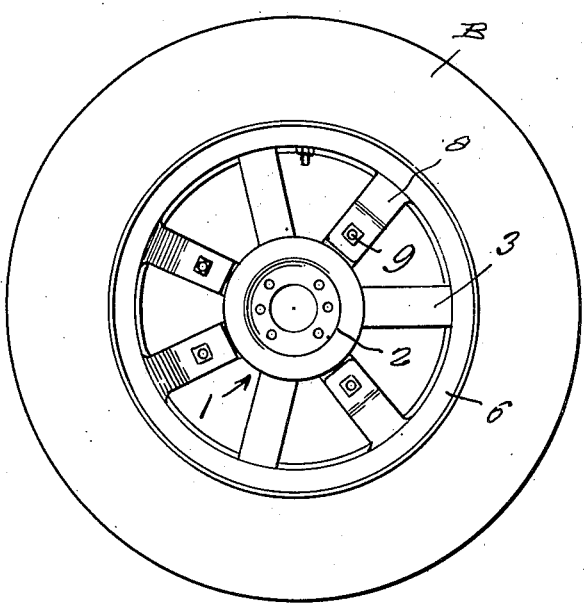
Figure 2 is a similar view looking at the opposite side.
Figure 3:
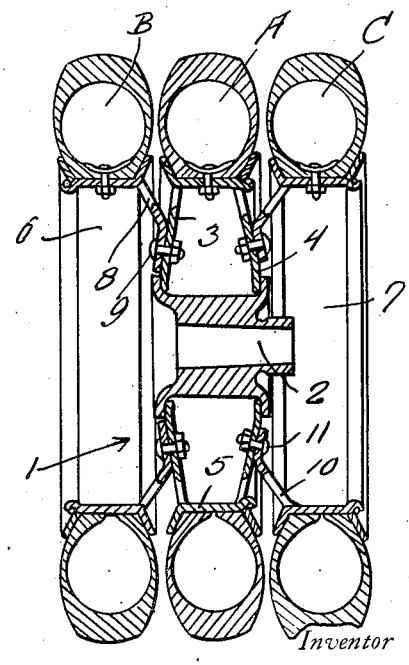
Figure 3 is a vertical sectional view through the wheel structure, parts of the spokes and the tongues or strips carried by the outer rims being shown in elevation.

A series of radial tongues or strips 8 extend inwardly from the inner edge portions of the rim 6 and the inner free ends of these tongues are disposed laterally for disposition against the outer faces of certain of the radial spokes 3 associated with the main or intermediate wheel 1 and a bolt and nut connection designated generally by the numeral 9 provides a means for securing the inner end portions of the tongues 8 to the adjacent spokes 3 in the manner as clearly shown in Figures 2 and 3 of the drawing.

A series of radially disposed tongues 10 extend inwardly from the inner edge portion of the other outer rim 7 and the free inner ends of these last mentioned tongues are disposed laterally for disposition against certain or adjacent spokes 4, and a bolt and nut connections 11 secures the inner free end portion of each tongue 10 to the adjacent spokes 4 as shown very clearly in Figures 1 and 3 of the drawing.

When the parts are thus arranged it will be seen that the rims 5, 6 and 7 will be secured together to provide a unitary wheel structure, and as all the rims are of the same size, and the same size tires are used on all the rims, a relatively wide surface engaging tread will be provided by the three tires, and such a wheel structure is more particularly adapted to be used in connection with Fordson tractors or trucks.

A wheel structure of this character may be readily and easily assembled or disassembled, and the parts are so arranged as to permit ready access to each of the rims, and furthermore the inflating valves associated with the pneumatic tires are also easily accessible.

A wheel structure of the above mentioned character can be manufactured at a very low cost and will at all times be strong and durable, and further well adapted for the purposes for which it is designed.

While I have shown the preferred embodiment of my invention, it is to be understood that various changes in the size, shape and arrangement of parts may be resorted to without departing from the spirit of the invention and the scope of the appended claims.

Having thus described the invention, what I claim as new is:—

1. A wheel structure comprising an intermediate wheel including a hub, spokes extending radially from the hub at the inner and outer end portions thereof, a flanged tire supporting rim to which the outer ends of the radial spokes are secured, additional tire supporting rims disposed on the opposite sides of the intermediate wheels, and means for securing the outer rims to the wheels.

2. A wheel structure comprising an intermediate wheel including a hub, spokes extending radially from the hub at the inner and outer end portions thereof, a flanged tire supporting rim to which the outer ends of the radial spokes are secured, additional tire supporting rims disposed on the opposite sides of the intermediate wheel, means for securing the outer rims to the wheel, said means comprising a series of radial tongues extending inwardly from the inner edge portion of each of the outer rims for disposition against the adjacent radial spokes of said wheel, and fastening means extending through the inner ends of the tongues and the adjacent spokes.

3. A wheel structure comprising a wheel including a hub, spokes extending radially from the hub, a flanged tire supporting rim to which the outer ends of the spokes are secured, an additional tire supporting rim disposed on one side of the wheel adjacent its rim, radial tongues extending inwardly from the inner edge portion of the additional rim, and means for securing said tongues to the adjacent spokes of the wheel.

In testimony whereof I affix my signature.

WILLIAM ANDREW HUTCHINSON.